United States Patent [19]
Yoneyama et al.

[11] Patent Number: 5,933,513
[45] Date of Patent: Aug. 3, 1999

[54] IMAGE PROCESSING SYSTEM FOR EXPANDING FOCAL DEPTH OF OPTICAL MACHINE

[75] Inventors: Takashi Yoneyama, Hachioji; Shinichi Hayashi, Tokyo, both of Japan

[73] Assignee: Olympus Optical Co., Ltd., Tokyo, Japan

[21] Appl. No.: 08/844,264

[22] Filed: Apr. 18, 1997

[30] Foreign Application Priority Data

Apr. 30, 1996 [JP] Japan ...................... 8-109714

[51] Int. Cl.⁶ .................. G06K 9/40; G06T 5/50
[52] U.S. Cl. .................. 382/106; 382/255; 382/261
[58] Field of Search .................. 382/106, 108, 382/255, 260, 261, 263, 264; 348/345, 348, 349, 360

[56] References Cited

U.S. PATENT DOCUMENTS

| | | | |
|---|---|---|---|
| 5,124,842 | 6/1992 | Honda et al. | 382/280 |
| 5,148,502 | 9/1992 | Tsujiuchi et al. | 382/255 |
| 5,282,045 | 1/1994 | Mimura et al. | 348/345 |
| 5,511,155 | 4/1996 | Yamaguchi | 395/133 |
| 5,604,825 | 2/1997 | Hirota et al. | 382/261 |

*Primary Examiner*—Scott Rogers
*Attorney, Agent, or Firm*—Frishauf, Holtz, Goodman, Langer & Chick

[57] ABSTRACT

An optical microscope comprises an image forming system including a CCD camera for picking up an image of a sample S, exchangeable objective lenses for projecting the image of the sample S on the image pick-up surface of the CCD camera, and an image pick-up unit, etc., driving motors for driving the objective lenses or a stage holding the sample S to displace the focal point of the image forming system relative to the sample S, an image integrating section for sequentially integrating a plurality of focused point images of the sample S sequentially output from the CCD camera, and a restoration filter section having a restoration film for restoring the focused point images from the integrated image, thereby outputting a restored image. On the basis of changes in optical conditions of the image forming system, optimal filter coefficients for the restoration filter are obtained from a table stored in a coefficient matrix table storage. On the basis of the optimal filter coefficients, values set for the restoration filter in the restoration filter section are changed.

11 Claims, 7 Drawing Sheets

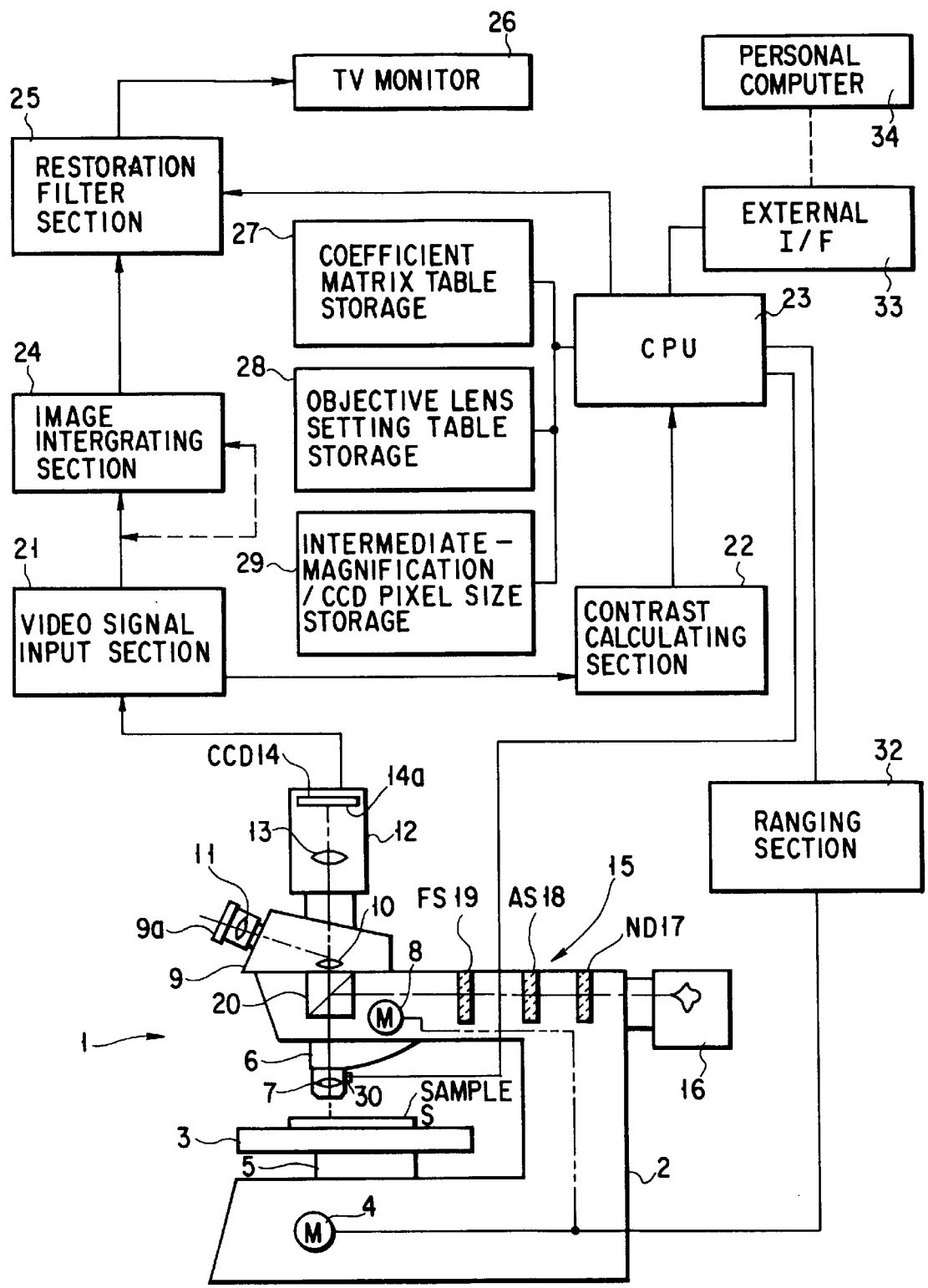
F I G. 1

FIG. 6

OBJECTIVE LENS C
OBJECTIVE LENS B
OBJECTIVE LENS A

| SIZE CCD<br>INTER-<br>MEDIATE<br>MAGNIFICATION | 2/3<br>(a μm) | 1/2<br>(b μm) | 1/3<br>(c μm) | 1/4<br>(d μm) |
|---|---|---|---|---|
| | FILTER<br>COEFFICIENTS 1<br>NUMBER OF PIXELS<br>TO BE THINNED x1 | COEFFICIENTS 2<br>x2 | | |
| 0.5 | | | | |
| 1 | ---------- | | ---------- | ---------- |
| 1.25 | | | | |
| 2 | | | | |
| 2.5 | | | | |
| ...... | | | | |

5 x 5

7 x 7

9 x 9

IMAGE PROCESSING SYSTEM FOR EXPANDING FOCAL DEPTH OF OPTICAL MACHINE

BACKGROUND OF THE INVENTION

This invention relates to an image processing system capable of providing, from a plurality of input images including images each focused at a corresponding level of a thick object (sample) with different thicknesses, an image appearing as if it is focused at each level of the object, i.e. as if it has an expanded focal depth.

To analyze an object using its input image, the image must have a high brightness, a high resolution and an expanded focal depth. In general, an image forming optical system which employs an optical element with a large aperture is necessary to optically pick up an image with a high resolution, a high magnification and a high brightness.

In an image forming optical element represented by a lens, however, the greater the aperture, the shallower the focal depth. Accordingly, if an image forming optical element with a great aperture is used for securing a high magnification, only the portion of an object which is situated in a position along the optical axis is in focus, and the other portions of the object which are situated in the other positions along the optical axis are out of focus. This is because the focal depth is shallow.

To avoid the above, in the field of optical devices such as a microscope, camera, an endoscope, etc., various means are conceived for increasing the focal depth. Japanese Patent Application KOKAI Publication No. 1-309478, for example, discloses a technique for adding a plurality of images respectively focused in different positions along the optical axis, and subjecting the added images to restoring processing using a restoration filter to thereby restore a single image focused in different positions along the optical axis. Moreover, Japanese Patent Application KOKAI Publications Nos. 1-309478 and 2-192276 disclose a technique using no restoration filter for subjecting a plurality of images to Fourier transform, then to summation, and to reverse Fourier transform, thereby restoring a single image focused in different positions along the optical axis.

At the time of using the above-described focal depth expanding means or restoration filter to restore a microscopic image, it is necessary to consider various matters peculiar to a microscope. Specifically, in the case of observing a sample with a microscope, the observer first searches, at a low magnification, a to-be-observed point within a wide range of the sample, and thereafter observes the point in detail at a high magnification by mainly switching objective lenses from one to another. The observer repeats this operation. In other words, at the time of using a microscope, its magnification is repeatedly switched, usually.

The image forming state of an image pick-up element incorporated in a microscope as above will now be described. The numerical aperture (NA') of the emission side of an image forming optical system depends upon the degree of magnification. Supposing that "integrated point image intensity distribution" means integration of all the point image intensity distributions of a certain point assumed from the state where the point is in true focus to the state where it is infinitely out of focus, the range of the integrated point image intensity distribution on the image pick-up element varies in accordance with the degree of magnification.

The restoration filter used for the focal depth expansion is determined on the basis of the range of the integrated point image intensity distribution on the image pick-up element. This is because the restoration filter provides an excellent restoration image only when the range of the integrated point image intensity distribution matches the range of the design value distribution of the restoration filter.

Referring to FIG. 8, the above matter will be explained specifically.

In FIG. 8, the abscissa indicates standardized distances from the center of a point image, while the ordinate indicates the intensities of the point image with a center intensity set to "1". The broken line indicates an ideal point image intensity distribution in a focal point, and each solid line indicates a restored point image intensity distribution obtained when the restoration filter is designed to meet with an integrated point image intensity distribution range which is $1/\beta$ of the range of the actual integrated point image intensity distribution.

As is understood from FIG. 8, an ideal restoration image can be obtained when $\beta=1$. However, when $\beta<1$, an image with a ringing edge portion is obtained, while when $\beta>1$, an image is obtained which has an intensity distribution range larger than an ideal point image intensity distribution range.

As explained above, the restoration filter provides an excellent restoration image only when the integrated point image intensity distribution range coincides with the design value distribution range of the restoration filter. Accordingly, a single restoration filter cannot provide excellent restoration images at different magnification degrees of a microscope.

In addition, the range of the integrated point image intensity distribution on the image pick-up element is determined not only by the numerical aperture NA' of the emission side of the image forming optical system, but also by the wavelength used in the system and the pupil function thereof. Thus, also when these factors do not coincide with the design values of the restoration filter, no excellent restoration image can be obtained. The use of a single restoration filter in a color CCD, etc. employed as the image pick-up element will cause a blurred restoration image.

Furthermore, the following is included in the problems peculiar to the microscope:

At the time of picking up an image of a sample using a microscope, the sample is often observed at a high magnification in order to examine a very small portion thereof. In this case, the range of the integrated point image intensity distribution on the image pick-up element is inevitably large. The restoration filter is usually set to a matrix size of about seven rows and seven columns in light of cost and time required to calculation. If the range of the integrated point image intensity distribution exceeds the size of the matrix, no excellent restoration image is obtainable.

If, on the other hand, the matrix size of the restoration filter is set larger than the range of the integrated point image intensity distribution in order to secure an excellent restoration image, the time and memory capacity required to calculation increase in proportion to the square value of the matrix size, which is significantly disadvantageous.

BRIEF SUMMARY OF THE INVENTION

This invention has been developed under the above-described circumstances, and aims to provide a focal depth expanding apparatus capable of forming an excellent restoration image even when the numerical aperture of the emission side of an image forming optical system, or the optical condition of an image pick-up element such as a wavelength used therein varies.

The invention also aims to provide a focal depth expanding apparatus capable of forming an excellent restoration image even from a greatly magnified image, using a restoration filter with a small matrix size.

To attain these aims, there is provided an image processing system for expanding a focal depth of an optical machine comprising:

an image pick-up element for picking up an image of a sample;

an image forming system for projecting the image of the sample on an image pick-up surface of the image pick-up element;

driving means for driving the image forming system to displace a focal point position of the image forming system relative to the sample;

an image integration section for sequentially integrating a plurality of focused point images of the sample sequentially output from the image pick-up element while the image forming system is driven, thereby outputting an integrated image;

a restoration section having a restoration filter for restoring the focused point images from the integrated image and outputting a restored image; and restoration filter setting means for obtaining optimal filter coefficients for the restoration filter on the basis of changes in the optical conditions of the image forming system, and changing set values for the restoration filter on the basis of the optimal filter coefficients.

As recited above, the restoration filter setting means changes the set values for the restoration filter on the basis of the relative relationship between the size of a light receiving element incorporated in the image pick-up means, and the range of an integrated point image distribution on a light receiving element, which is determined by the numerical aperture and the pupil function of the image forming system and also by the wavelength of image forming light, etc.

By virtue of this structure, a good restoration image can be obtained at all times irrespective of the optical conditions (magnification, numerical aperture, etc.) of the image forming system, the size of the image pick-up element, or the wavelength of the image forming light.

At the time of using a color image pick-up element, it is preferable to select restoration filter coefficients for each of light wavelengths or of wavelength ranges used in the image pick-up. In this case, an excellent restoration image with few blur can be obtained.

Moreover, if the filter size determined by a set of optimal filter coefficients is larger than the size which can actually be set for the restoration filter in the restoration section, it is preferable to set a restoration filter by thinning predetermined ones out of the set of optimal filter coefficients.

This enables an excellent restoration image to be obtained using a restoration filter with a small size even in an observation at a great magnification.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, servo to explain the principles of the invention.

FIG. 1 is a diagram, showing the structure of a microscope according to a first embodiment of the invention;

FIG. 6 is an example of a coefficient matrix table used in the second embodiment;

DETAILED DESCRIPTION OF THE INVENTION

Figure 2:
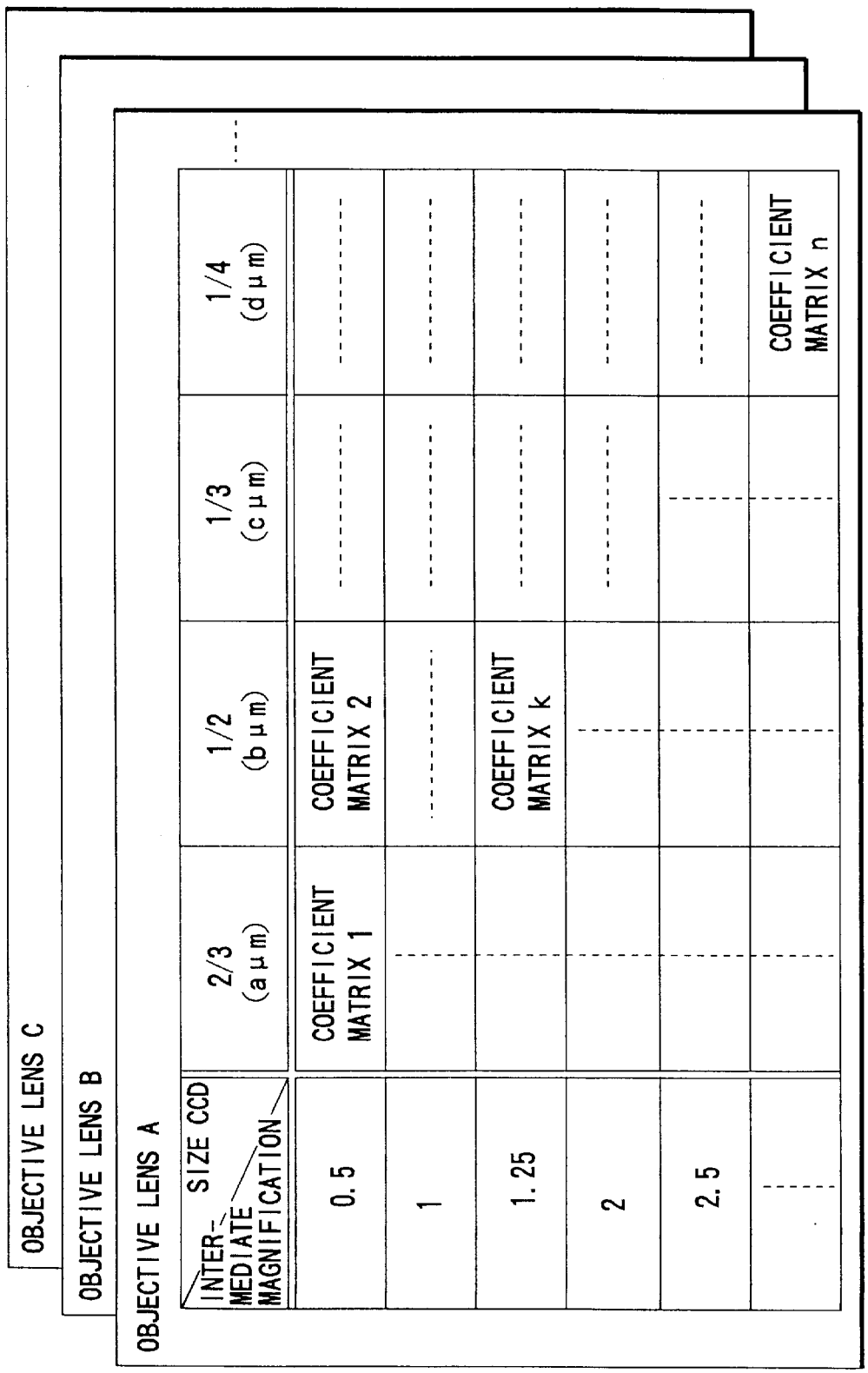
FIG. 2 is an example of a coefficient matrix table used in the first embodiment.

The embodiments of the invention will be described with reference to the accompanying drawings.

(First Embodiment)

FIG. 1 shows a microscope system for reflected-illumination observation to which the invention is applied.

This system comprises a microscope 1 for reflected-illumination observation and an electric circuit section.

The reflected-illumination observation microscope 1 has a microscope main body 2. The main body 2 has a stage 3 for holding a sample S. The stage 3 is vertically driven by a stage driving section 5, which is driven by a first motor 4 located in the microscope main body 1.

A revolver 6 holding a plurality of objective lenses 7 is rotatably attached to the portion of the main body 2 opposed to the stage 3. The one of the objective lenses 7 which has a predetermined magnification is positioned on the optical axis by rotating the revolver 6. The revolver 6 may be disposed to be vertically driven. In this case, it is driven by a second motor 8 installed in the main body 2.

An eye-piece lens barrel 9 is provided on the upper surface of the main body 2 for dividing the path of observation light having passed an image forming lens shown in FIG. 10, into a path directed to an eye piece 11 and a path directed to an image pick-up unit 12. A photographing lens 13 and a CCD camera 14 are provided in this order on an optical path for photograph in the image pick-up unit 12.

A reflected-fluorescence projecting pipe 15 is provided on the upper surface of the main body 2 for projecting illumination light to the sample S held on the stage 3. A light source lamp 16 is attached to an end of the pipe 15 outside the main body 2. A neutral density filter (ND) 17, an aperture stop (AS) 18 and a field stop (FS) 19 are arranged in this order on the optical path of the light source lamp 16, which passes through the pipe 15.

The illumination light having passed the ND 17, the AS 18 and the FS 19 are directed downward through a reflected illumination cube 20, and reach the sample S via the objective lens 7. Light reflected from the sample S again passes the objective lens 7, and reaches the observation surface 9a of the eye-piece lens barrel 9 and the image pick-up surface 14a of the CCD camera 14, thereby forming its image thereon.

An image signal is output from the CCD camera 14 to a video signal input section 21, which in turn processes the image signal and outputs the same to a contrast calculating section 22. The contrast calculating section 22 has a function for estimating the received image signal using a predetermined estimation function, and determining whether or not the image signal should be subjected to image integration. If the calculating section 22 determines that the image signal should be subjected to image integration, the image signal is transferred from the video signal input section 21 to an image integrating section 24 under the control of a CPU 23. The image integrating section 24 sequentially adds image signals indicative of images within one field, thereby providing an integrated image signal.

The integrated image signal is transferred from the image integrating section 24 to a restoration filter section 25, which in turn activates a restoration filter. The restoration filter is a kind of a spatial filter, which is set in accordance with the intermediate magnification of an image pick-up system and the number of pixels of the CCD camera, as will be described later, and is used to restore, from the integrated image signal, an image signal indicative of an image focused at all points within the one field. The image filtered and restored by the restoration filter section 25 is output to a TV monitor 26 and displayed thereon.

The restoration filter section 25 is adapted to change the set values for the restoration filter on the basis of an instruction from the CPU 23. To output the instruction, the CPU 23 is connected to a coefficient matrix table storage 27 storing coefficient matrix tables with coefficient matrices (filter coefficients) for the restoration filter, an objective lens setting table storage 28 storing an objective lens setting table with set values for each objective lens 7, and an intermediate-magnification/CCD-pixel-size storage 29 storing the intermediate magnification of the image pick-up system and the number of pixels of the CCD camera 14. Each of the storages 27–29 consists of a peripheral memory (e.g. a ROM) to be accessed by the CPU 23 at high speed.

FIG. 2 shows one of coefficient matrix tables stored in the coefficient matrix table storage 27. As is understood from FIG. 2, each coefficient matrix table is provided for a corresponding objective lens (A, B, C . . . ) incorporated in the microscope system. In each coefficient matrix table, the filter coefficients of a spatial filter constituting the restoration filter are set in the form of a coefficient matrix k (k=1, 2, . . . , n−1, n) with respect to a combination of each of intermediate magnifications and each of CCD camera pixel sizes (CCD inch sizes). The coefficient matrix k indicates optimal filter coefficients arranged in the form of a matrix and used for restoring an integrated image obtained by corresponding optical conditions.

On the other hand, the objective lens setting table, which is not illustrated but stored in the objective lens setting table storage 28, shows the magnification and the numerical aperture (NA) of each objective lens 7 fitted in a corresponding objective lens fitting hole formed in the revolver 6. The objective lens setting table is input by the observer before the microscope system is used. The CPU 23 detects, on the basis of the rotational position of the revolver 6, which one of the objective lenses is situated on an observation optical path, and obtains optical data on the detected lens from the objective lens setting table.

The intermediate-magnification/CCD-pixel-size storage 29 stores the intermediate magnification of the image pick-up unit 12 and the pixel size of the CCD camera 14, which are beforehand set by the observer. The CPU 23 accesses the storage 29 when necessary to obtain them.

The CPU 23 can control the first motor 4 or the second motor 8 via a ranging driver denoted by reference numeral 32 in FIG. 1, so as to vertically move the stage 3 or the revolver 6. Furthermore, the CPU 23 is connected to an external interface (I/F) 33 as an external controller for controlling the overall system, and also to a personal computer 34 via the external I/F 33.

The operation of the microscope system constructed as above will be described with reference to the flowchart shown in FIG. 3.

First, a signal for triggering image restoration processing is input to the CPU 23 via an external I/F 33 (step S1). The CPU 23 in turn determines on the basis of the output of the contrast calculating section 22 whether or not control can be performed where the stage 3 is situated in the present position (step S2). If the CPU 23 determines that control cannot be started for the reason, for example, that the output of the contrast calculating section 22 is lower than a predetermined value, it causes a message for informing the observer of the fact to be displayed on the screen of a personal computer 34 or on a dedicated display (not shown) (step S2'). In response to the message, the observer adjusts the position of the stage 3.

If, on the other hand, the CPU 23 determines in the step S2 that control can be performed, it controls a focus driving section 32 so as to move the stage 3 (or the revolver 6) upward or downward (step S3). The CPU 23 stops the movement of the stage 3 in a position assumed when the output of the contrast calculating section 22 indicates that the sample has a completely blurred image (step S4).

Thereafter, in a step S5, the CPU 23 moves the stage 3 in a direction opposite to the direction in which it moves the stage 3 to find the position of the blurred image. During movement of the stage 3, the CPU 23 determines on the basis of the output of the contrast calculating section 22 whether or not image integration should be started at the present position of the stage 3, and stops the movement of the stage 3 when the stage 3 is situated in a position (vertical position) assumed when the output of the contrast calculating section 22 indicates that the image integration should be performed (step S6).

Subsequently, the CPU 23 starts image integration processing at the present position of the stage 3 (step S7). Specifically, while the CPU 23 controls the stage 3 so as to move at a constant speed (step S8), it sequentially integrates, until an instruction to stop the image integration is output, image signals successively input from the video signal input section 21 to the image integrating section 24 and indicative of images of the sample assumed at respective positions of the stage 3. The CPU 23 estimates the output of the contrast calculating section 22 even while it performs the image integration. The estimation value changes in accordance with a change in the position of the stage 3, and the CPU 23 stops the image integration when the estimation value reaches a predetermined value. Thus, the movement of the stage 3 and the image integration are repeated until the integration stop is determined (step S9).

After the image integration is finished, the integrated image obtained by the image integrating section is transferred to the restoration filter section 25, where restoration processing is performed in order to obtain an image focused at all points of the screen (step S10). This restoration processing will be described later in more detail.

On the other hand, the image restored by the restoration filter section 25 is output to the TV monitor 17 in a step S11, followed by termination of the restoration processing (step S12).

Thereafter, the restoration processing performed in the step S10 will be described in detail with reference to FIG. 4.

When processing for restoring the integrated image is started in a step S20, the CPU 23 accumulates data concerning the optical conditions of the objective lens presently used for observation, using a sensor incorporated in the revolver 4.

More specifically, set data (i.e. magnification and NA) concerning the objective lens presently used for observation is retrieved from the objective lens setting table stored in the objective lens setting table storage 28.

Then, the CPU 23 detects the intermediate magnification of the image pick-up system and the pixel size of the CCD camera 14 from the intermediate-magnification/CCD-pixel-size storage 29 (steps S22 and S23). As aforementioned, the intermediate magnification and the CCD camera pixel size are prestored as set values in the storage (ROM) 29 by the observer.

After accumulating the data concerning the optical conditions as above, the CPU 23 selects a coefficient matrix suitable to the optical conditions from the coefficient matrix tables (FIG. 2) stored in the coefficient matrix table storage 27 (step S24). As described above, in each coefficient matrix table dedicated to a corresponding objective lens 7 (i.e. A, B, C . . . ), the filter coefficients of the spatial filter constituting the restoration filter are set in the form of a matrix in accordance with a combination of each of the intermediate magnifications and each of the CCD camera pixel sizes.

After selecting the ones of the restoration filter coefficients which are suitable to the optical conditions, the CPU 23 sets the selected restoration filter coefficients in the restoration filter section 25 (step S25). As a result, the filter size and filter coefficients of the restoration filter set in the restoration filter section 25 are updated to optimal values for the optical conditions of the microscope system.

After finishing the above-described optimization of the restoration filter, image restoration processing is performed using the optimized restoration filter.

As described above, in the first embodiment, the conditions of the restoration filter can be varied in accordance with the elements which influence the aperture of the emission side of the image forming optical system, i.e. the magnification and numerical aperture of the objective lens 7, the intermediate magnification of the image pick-up system, and the pixel size of the CCD camera 14. Accordingly, the restoration filter can be set optimally in accordance with the point image intensity distribution on the image pick-up element, thereby performing restoration processing in a reliable manner.

Even when the magnification and NA of the objective lens 7 are greatly changed in accordance with changes in the optical conditions of the microscope system, an optimal restoration filter for the changed optical conditions is selected, and therefore an image with excellent resolution and brightness and a deep focal depth can be obtained irrespective of the optical conditions.

Although in the first embodiment, filter coefficients suitable to optical conditions are read from the coefficient matrix table, such suitable filter coefficients may be calculated in the stage of initializing the CPU.

Figure 3:
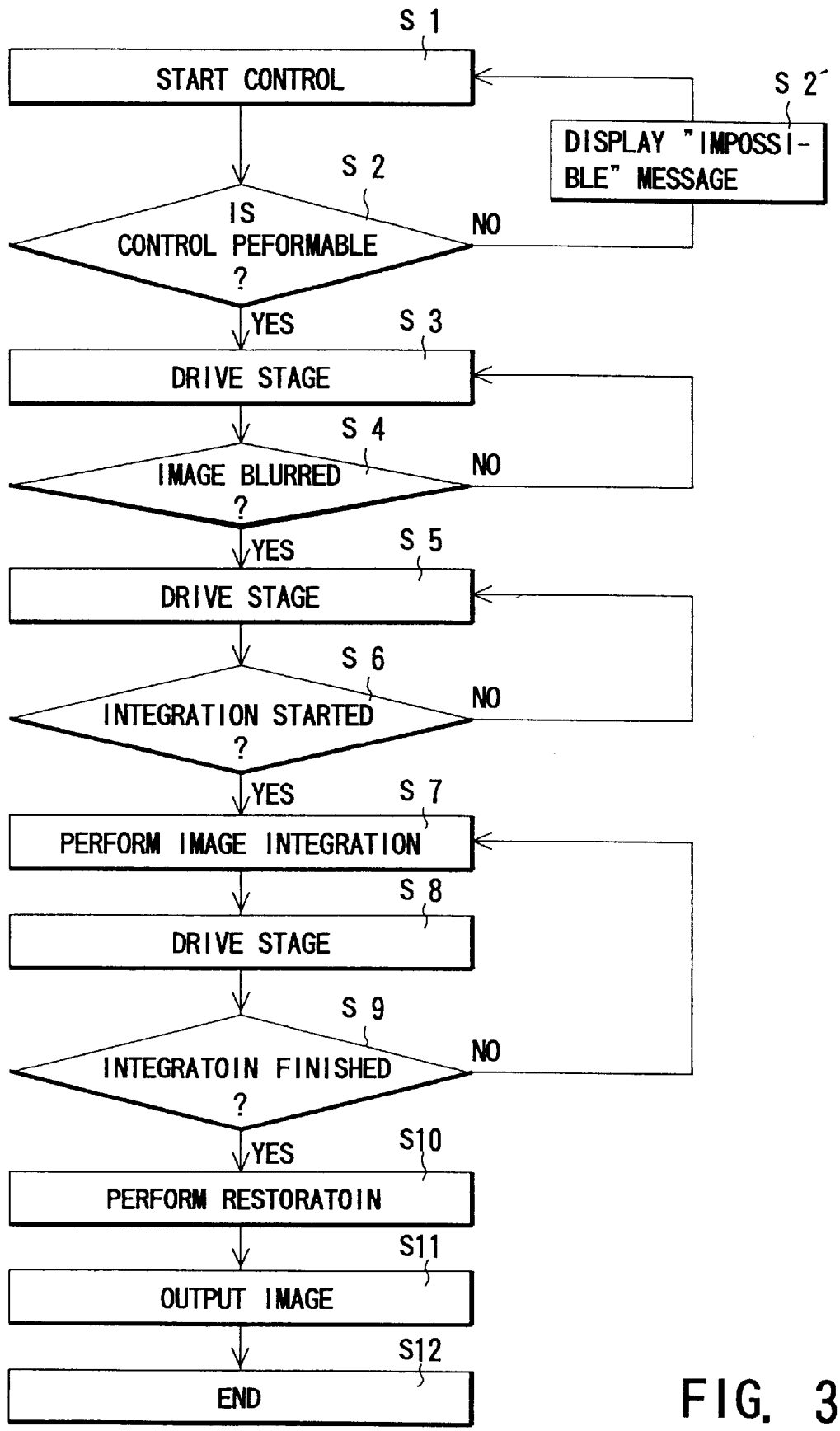
FIG. 3 is a flowchart, useful in explaining processing performed in the first embodiment.

The steps S3 and S4 of the flowchart of FIG. 3 are not necessary if the position of the stage 3 assumed when the processing of integration is to be started is detected before the processing.

Moreover, although in the first embodiment, the stage 3 is moved to obtain a plurality of focused point images, the revolver 6 may be vertically moved instead by operating the second motor 8.

(Second Embodiment)

A microscope system according to a second embodiment will be described.

The optical system and the other hardware have the same structures as those employed in the first embodiment.

The second embodiment is directed to optimization of a restoration filter as in the first embodiment, and characterized in that even if the optimal matrix size of a restoration filter presently installed is larger than its actual maximum matrix size, the filter can perform satisfactory filtering. The structure of the second embodiment will be described in detail.

Figure 5:
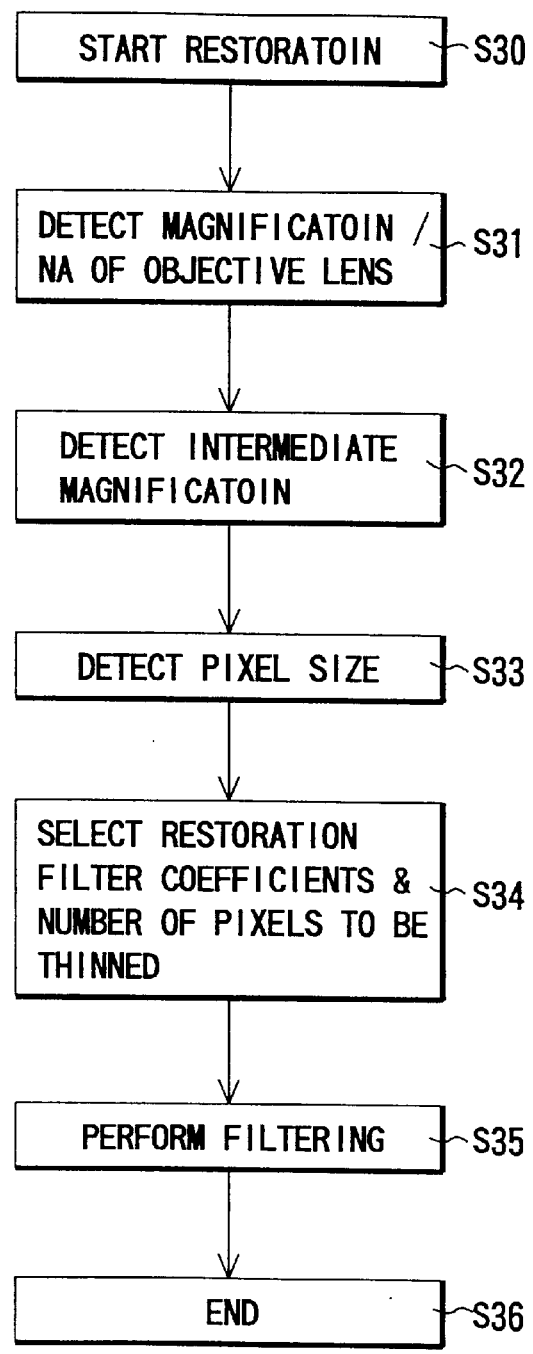
FIG. 5 is a flowchart, useful in explaining processing for optimizing a restoration filter and processing for restoring an image, performed in a second embodiment.

FIG. 5 is a flowchart, useful in explaining optimization of a restoration filter performed in light of the actual matrix size of the filter.

In the second embodiment, after finishing the image integration in the steps S7–S9 of FIG. 3, restoration processing in the step 10 of FIG. 3 is performed in accordance with the flowchart of FIG. 5.

First, when restoration processing of an integrated image is started in a step S30, the CPU 23 detects the magnification and NA of an objective lens presently used for observation on the basis of the objective lens setting table stored in the objective lens setting table storage 28 (step S31). Subsequently, the CPU 23 detects an intermediate magnification determined by the image pick-up unit 12 and its eye piece 11 (step S32), and detects the pixel size of the CCD camera 14 of the image pick-up unit 12 (step S33). Since the intermediate magnification and the CCD pixel size are prestored by the observer in the intermediate-magnification/CCD-pixel size storage 29, the CPU 23 retrieves the intermediate magnification and the pixel size from the storage 29.

After data concerning optical conditions is obtained as above, the CPU 23 accesses a coefficient matrix table stored in the coefficient matrix table storage 27 and retrieves necessary data therefrom on the basis of the data concerning the optical conditions.

The second embodiment employs a coefficient matrix table as shown in FIG. 6. As shown in FIG. 6, each section, which is referred to on the basis of a corresponding intermediate magnification and CCD pixel size, stores "number Xk of to-be-thinned pixels" (k=1, 2, . . . , n) as well as filter coefficients arranged in the form of a coefficient matrix. The"number Xk of to-be-thinned pixels" will now be explained.

Figure 7A:
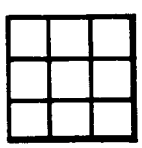
FIGS. 7A–7D are views, useful in explaining processing for thinning out pixels performed in the second embodiment.
Figure 7A:
Figure 7A:
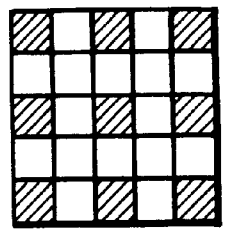
Figure 7B:
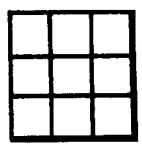
Figure 7B:
Figure 7B:
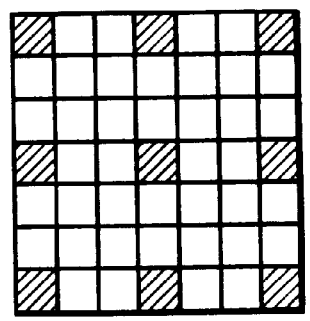

Concerning the restoration filter installed in the restoration filter section 25, a maximum matrix size which can be set is predetermined. However, it is possible that an optimal matrix size based on the optical conditions of the microscope system is much larger than the maximum matrix size. For example, in a case where the optimal matrix size is (9×9) and a restoration filter of a matrix (3×3) is used in the system, nine restoration filters of the size (3×3) are required as shown in FIG. 7D. However, using a plurality of filters disadvantageously increases the size and cost of the microscope system.

Figure 7C:
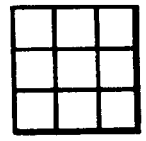
Figure 7C:
Figure 7C:
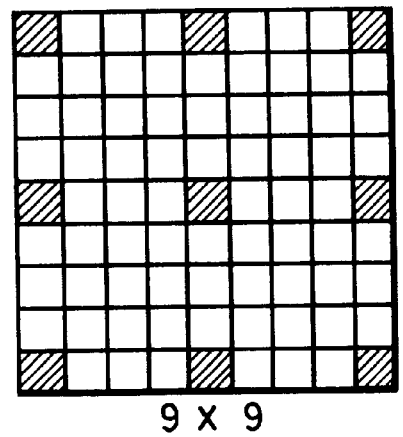
Figure 7D:
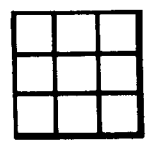
Figure 7D:
Figure 7D:
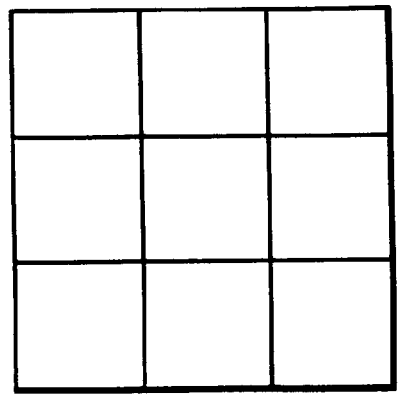
Figure 8:
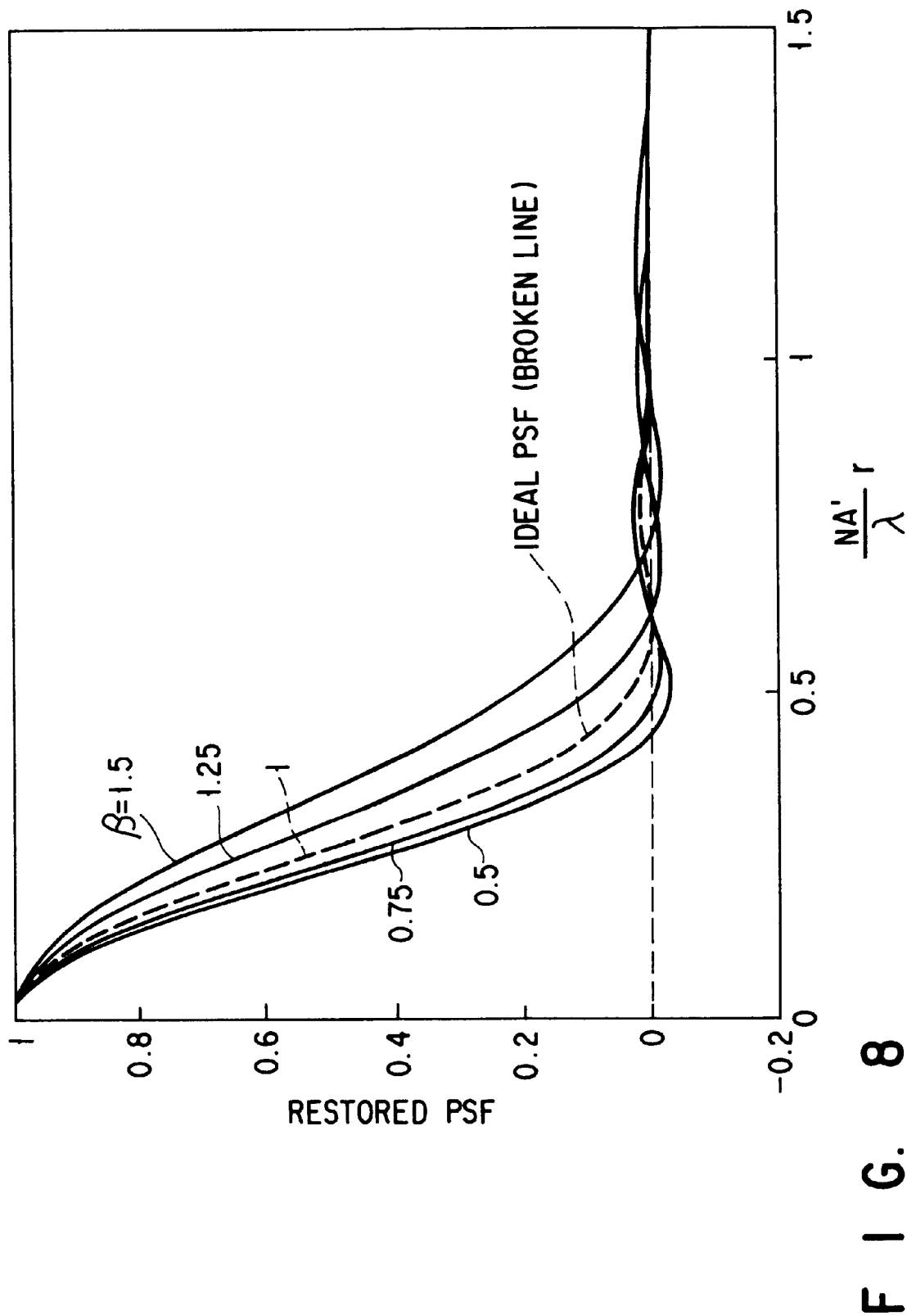
FIG. 8 is a graph, showing the point image intensity distributions of restoration images according to the degrees of matching between the restoration filter and the ranges of the point image intensity distributions on an image pick-up element, respectively.

To avoid this, the second embodiment is constructed as shown in FIG. 7C. In a case, for example, where the optimal matrix size is (9×9), pixels other than the hatched ones are thinned out of the matrix (9×9), thereby enabling a spatial filter with a matrix (3×3) to obtain a function similar to that obtained by a spatial filter with a matrix (9×9). Similarly, the same can be realized where the optimal matrix size is (5×5)

or (7×7) as shown in FIG. 7A or 7B. The numbers of pixels to be thinned out are stored as "numbers of to-be-thinned pixels" in the coefficient matrix table, as well as filter coefficients (arranged in the form of coefficient matrices).

In the second embodiment, restoration processing suitable to optical conditions can be performed by setting the filter coefficients and the number of to-be-thinned pixels to respective optimal values. Since the maximum size of the restoration filter is predetermined, and the matrix size of an optimal restoration filter for optical conditions can be calculated before the microscope system is used, the number of pixels to be thinned out for creating a restoration filter with a matrix similar to an optimal restoration filter matrix within the maximum matrix size thereof can be calculated beforehand if the size of the optimal restoration filter matrix is greater than the maximum matrix size.

After accumulating data concerning the optical conditions, the CPU 23 determines a coefficient matrix and the number of pixels to be thinned from the one of the coefficient matrix tables which corresponds to the optical conditions (step S34). Then, the determined number of pixels are thinned out of an optimal pixel matrix, thereby obtaining a coefficient matrix of a size limited less than the matrix size of the presently installed restoration filter, and using it as the filter coefficient matrix. To reduce the required processing time, a coefficient matrix of a size, which is limited to a predetermined matrix size using the number of to-be-thinned pixels, may be stored at the time of calculating the number of the to-be-thinned pixels.

Thus, the coefficient matrix of the size limited to a predetermined matrix size on the basis of the optical conditions is set as that of the restoration filter in the restoration filter section 25. Accordingly, if the matrix size of an optimal restoration filter is (9×9), a restoration filter with a matrix (3×3) obtained by thinning out the pixels other than the hatched ones is used as shown in FIG. 7C. In other words, an integrated image with a size (9×9) is converted to an image with a size (3×3) by dispersedly thinning out a corresponding number of pixels, and the resultant integrated image is subjected to restoration processing using the restoration filter with the matrix size (3×3).

As described above, even if in the microscope system according to the second embodiment, objective lenses of greatly different magnifications and NAs are used, optimal restoration filters for the lenses can be set. Moreover, even when the filter size of an optimal restoration filter exceeds that of the presently installed restoration filter, the presently installed restoration filter can be used as the optimal restoration filter. As a result, an image having excellent resolution and brightness and a deep focal depth can be obtained at low cost irrespective of optical conditions, without increasing the filter size or the number of used filters.

Although in the second embodiment, a restoration filter suitable to optical conditions is read from a table, it may be calculated in the stage of initializing the CPU or be set by the observer.

(Third Embodiment)

A microscope system according to a third embodiment is adapted to switch the restoration filter from one to another in accordance with the wavelength of light or the wavelength range of R, G, B, etc. In other words, the point image intensity distribution on the image pick-up surface is also influenced by the wavelength of light, and hence more appropriate image restoration processing can be performed by changing the restoration filter in accordance with the wavelength.

To this end, in the third embodiment, a coefficient matrix table for the restoration filter is prepared for each of the wavelengths of an integrated image or for each of wavelength ranges of the same, such as R, G, B, etc. Thus, the restoration filter coefficient matrix is selected on the basis of the conditions of a used wavelength, as well as the above-described optical conditions.

Since, for example, a signal indicative of a color image consists of RGB signal components, image addition is performed for each of R, G and B, and each addition result is subjected to restoration processing using a corresponding restoration filter. This processing can be performed by the same system structure as that of the first embodiment, if optimal restoration filters for the R, G, and B wavelength ranges are prepared in addition to the restoration filters shown in FIGS. 2 and 6, and are adapted to be selectively read from a memory such as a ROM.

(Fourth Embodiment)

A microscope system according to a fourth embodiment is adapted to switch the restoration filter from one to another in accordance with the pupil function of the image forming optical system.

Since the point image intensity distribution on the image pick-up surface is also influenced by the pupil function of the image forming optical system, more appropriate image restoration processing can be performed by changing the restoration filter in accordance with the pupil function.

At the time, for example, of performing observation by the apodization, the remoter from the center a surface portion of the pupil, the lower the transmissivity thereof. Accordingly, the amplitude of the pupil function differs from that employed in a usual observation where the transmissivity is set constant. In light of this, in the fourth embodiment, information concerning the apodization is input to restoration filter switch means, thereby switching the restoration filter from one to another in accordance with the transmissivity to enable more appropriate image processing.

(Fifth Embodiment)

Different types of objective lenses have different aberrations. The aberration influences the phase element of the pupil function. Therefore, more appropriate image processing can be performed by inputting the aberration of each objective lens, as data thereon, as well as its magnification and aperture, and selecting a restoration filter on the basis of the aberration, too.

The present invention is not limited to the above-described embodiments, which are preferable to carry out the claimed invention. Those embodiments can, of course, be modified in various manners without departing from the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An image processing system for expanding a focal depth of an optical machine, comprising:
   an image pick-up element for picking up an image of a sample;
   an image forming system for projecting the image of the sample on an image pick-up surface of the image pick-up element, the image forming system having a plurality of objective lenses exchangeable with each other;

driving means for driving the image forming system to displace a focal point position of the image forming system relative to the sample;

an image integration section for sequentially integrating a plurality of focused point images of the sample sequentially output from the image pick-up element while the image forming system is driven, thereby outputting an integrated image;

a restoration section having a restoration filter for restoring the focused point images from the integrated image and outputting a restored image; and restoration filter setting means for obtaining optimal filter coefficients for the restoration filter on the basis of changes in the optical conditions of the image forming system, and changing set values for the restoration filter on the basis of the optimal filter coefficients.

2. The image processing system according to claim 1, wherein the restoration filter setting means obtains the optimal filter coefficients for the restoration filter in accordance with a change in numerical aperture of an emission side of the image forming system, thereby changing the set values for the restoration filter in the restoration section on the basis of the optimal filter coefficients.

3. The image processing system according to claim 1, wherein the restoration filter setting means comprises:

filter coefficient storage tables for the respective objective lenses;

means for selecting one of the filter coefficient storage tables which corresponds to one of the objective lenses which is used at present; and means for reading predetermined filter coefficients from the selected filter coefficient storage table, thereby changing the set values for the restoration filter.

4. The image processing system according to claim 3, wherein the restoration filter setting means stores, in each of the filter coefficient storage tables, a plurality of filter coefficients corresponding to each of intermediate magnifications of the image forming system.

5. The image processing system according to claim 3, wherein the restoration filter setting means stores, in each of the filter coefficient storage tables, a plurality of filter coefficients corresponding to each of image pick-up sizes of the image pick-up element.

6. The image processing system according to claim 3, wherein the restoration filter setting means stores, in each of the filter coefficient storage tables, a plurality of filter coefficients corresponding to a combination of each of intermediate magnifications of the image forming system and each of image pick-up sizes of the image pick-up element.

7. The image processing system according to claim 3, wherein the restoration filter setting means stores, in each of the filter coefficient storage tables, a plurality of filter coefficients corresponding to wavelength ranges of the integrated image, and changes the set values for the restoration filter for each of the wavelength ranges.

8. The image processing system according to claim 3, wherein the wavelength ranges correspond to R, G and B when the integrated image is a color image.

9. The image processing system according to claim 1, wherein the restoration section sets the restoration filter by thinning out a predetermined number of optimal filter coefficients from the optimal filter coefficients when a filter size determined by the optimal filter coefficients is larger than a size of the restoration filter in the restoration section, which can be set.

10. The image processing system according to claim 9, wherein the restoration filter setting means includes:

filter coefficient storage tables each of which stores, for each objective lens, optimal filter coefficients and the number of optimal filter coefficients to be thinned;

means for selecting one of the filter coefficient storage tables which corresponds to an objective lens incorporated in the image forming optical system, thereby selecting filter coefficients from the selected filter coefficient storage table and changing set values for the restoration filter; and means for selecting the filter coefficients and the number of the ones of the filter coefficients which are to be thinned.

11. The image processing system according to claim 1, wherein the restoration filter setting means includes:

means for obtaining optimal filter coefficients for the restoration filter in accordance with a change in pupil function of the image forming system; and means for changing the set values for the restoration filter in the restoration section on the basis of the optimal filter coefficients.

* * * * *

UNITED STATES PATENT AND TRADEMARK OFFICE
CERTIFICATE OF CORRECTION

PATENT NO. : 5,933,513
DATED : August 3, 1999
INVENTOR(S) : YONEYAMA et al.

It is certified that error appears in the above-identified patent and that said Letters Patent is hereby corrected as shown below:

<u>In the DRAWINGS,</u>

Figure 4:
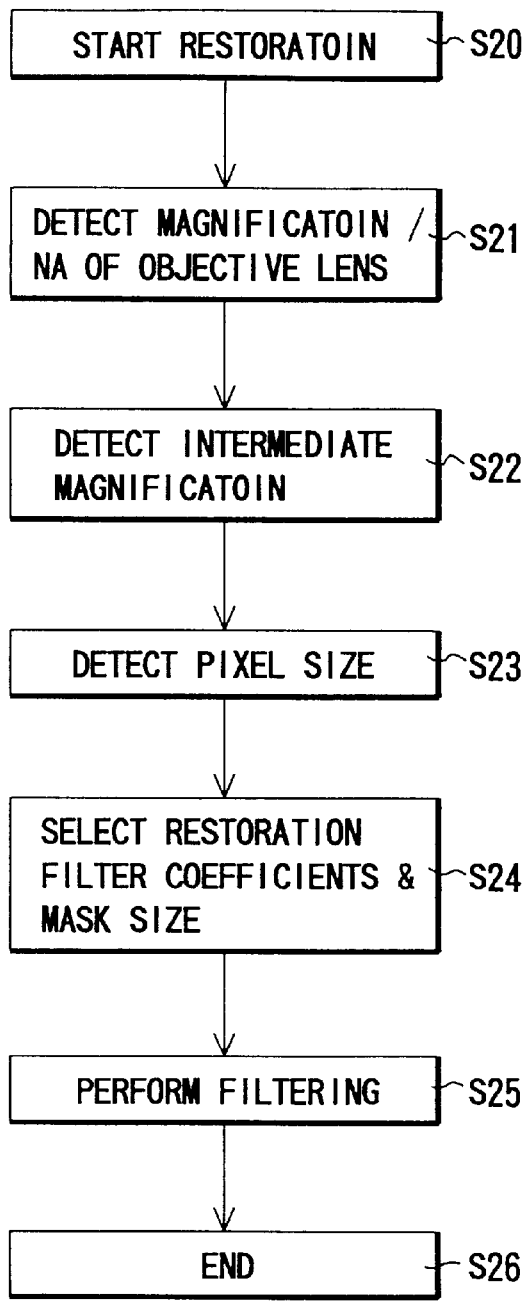
FIG. 4 is a flowchart, useful in explaining processing for optimizing a restoration filter incorporated in the first embodiment.

Fig. 1, box 24, change "INTERGRATING" to --INTEGRATING--;

Fig. 3, box S10, change "RESTORATOIN" to --RESTORATION--;

Fig. 4, box S20, change "RESTORATOIN" to --RESTORATION--;
 boxes S21 and S22, change "MAGNIFICATOIN" to --MAGNIFICATION--;

Fig. 5, box S30, change "RESTORATOIN" to --RESTORATION--;
 boxes S31 and S32, change "MAGNIFICATOIN" to --MAGNIFICATION--.

Signed and Sealed this

Seventh Day of November, 2000

Attest:

Q. TODD DICKINSON

*Attesting Officer*  *Director of Patents and Trademarks*